US011455245B2

(12) United States Patent
Duan et al.

(10) Patent No.: US 11,455,245 B2
(45) Date of Patent: Sep. 27, 2022

(54) SCHEME TO IMPROVE EFFICIENCY OF GARBAGE COLLECTION IN CACHED FLASH TRANSLATION LAYER

(71) Applicant: Micron Technology, Inc., Boise, ID (US)

(72) Inventors: Xinghui Duan, Shanghai (CN); Giuseppe D'Eliseo, Caserta (IT); Lalla Fatima Drissi, Ottaviano (IT); Giuseppe Ferrari, Naples (IT); Eric Kwok Fung Yuen, Dublin, CA (US); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 853 days.

(21) Appl. No.: 16/076,288

(22) PCT Filed: Dec. 11, 2017

(86) PCT No.: PCT/CN2017/115425
§ 371 (c)(1),
(2) Date: Aug. 7, 2018

(87) PCT Pub. No.: WO2019/113729
PCT Pub. Date: Jun. 20, 2019

(65) Prior Publication Data
US 2021/0182189 A1 Jun. 17, 2021

(51) Int. Cl.
*G06F 12/02* (2006.01)
*G06F 12/1009* (2016.01)

(52) U.S. Cl.
CPC ...... *G06F 12/0253* (2013.01); *G06F 12/1009* (2013.01); *G06F 2212/1044* (2013.01);
(Continued)

(58) Field of Classification Search
None
See application file for complete search history.

(56) References Cited

U.S. PATENT DOCUMENTS

| 7,818,525 | B1 | 10/2010 | Frost et al. |
| 8,117,406 | B2 | 2/2012 | Whang et al. |
| (Continued) | | | |

FOREIGN PATENT DOCUMENTS

WO WO-2014209234 A1 12/2014

OTHER PUBLICATIONS

"International Application Serial No. PCT/CN2017/115425, International Search Report dated Sep. 10, 2018", 5 pgs.
(Continued)

*Primary Examiner* — Tracy C Chan
(74) *Attorney, Agent, or Firm* — Schwegman Lundberg & Woessner, P.A.

(57) ABSTRACT

A variety of applications can include apparatus and/or methods of operating the apparatus in which storage in the memory device is managed. An allocation can include conducting a garbage collection procedure to free up one or more blocks. In various embodiments, execution of a garbage collection procedure can be based on operation of two tables with respect to a logical to physical mapping table split into logical to physical mapping table regions saved in the memory device. The first table can maintain counts of valid pages in blocks for a logical to physical mapping table region. The second table can include bits to identify logical to physical mapping table regions involved in the garbage collection procedure based on the entries in the first table. Search of the second table can determine logical to physical mapping table regions involved in the garbage collection. Additional apparatus, systems, and methods are disclosed.

25 Claims, 10 Drawing Sheets

(52) U.S. Cl.
CPC ............... *G06F 2212/7201* (2013.01); *G06F 2212/7205* (2013.01)

(56) References Cited

U.S. PATENT DOCUMENTS

| | | | |
|---|---|---|---|
| 8,291,295 | B2 | 10/2012 | Harari et al. |
| 8,489,907 | B2 | 7/2013 | Wakrat et al. |
| 8,572,310 | B2 | 10/2013 | Oh et al. |
| 8,745,319 | B2 | 6/2014 | Langlois et al. |
| 8,880,779 | B2 | 11/2014 | Fai et al. |
| 8,904,146 | B1 | 12/2014 | Lazar et al. |
| 8,966,205 | B1* | 2/2015 | Lo ..................... G06F 12/0246 711/165 |
| 8,966,319 | B2 | 2/2015 | Fai et al. |
| 9,176,864 | B2 | 11/2015 | Gorobets et al. |
| 9,342,389 | B2 | 5/2016 | Tang et al. |
| 9,389,805 | B2 | 7/2016 | Cohen et al. |
| 9,405,717 | B2 | 8/2016 | Brontvein et al. |
| 2008/0195801 | A1 | 8/2008 | Cheon et al. |
| 2008/0307192 | A1 | 12/2008 | Sinclair et al. |
| 2009/0198947 | A1 | 8/2009 | Khmelnitsky et al. |
| 2010/0312948 | A1 | 12/2010 | Yano et al. |
| 2011/0202812 | A1* | 8/2011 | Asano ................ G06F 11/1068 714/747 |
| 2011/0231624 | A1* | 9/2011 | Fukutomi ............ G06F 3/0679 711/E12.001 |
| 2012/0254699 | A1 | 10/2012 | Ruby et al. |
| 2012/0297122 | A1 | 11/2012 | Gorobets et al. |
| 2014/0254042 | A1 | 9/2014 | Yeo et al. |
| 2015/0347028 | A1 | 12/2015 | Kotte et al. |
| 2015/0347029 | A1 | 12/2015 | Kotte |
| 2016/0139812 | A1 | 5/2016 | Zhang |
| 2016/0283368 | A1* | 9/2016 | Hada .................... G06F 12/0246 |
| 2017/0024163 | A1 | 1/2017 | Zhang et al. |
| 2017/0024326 | A1 | 1/2017 | Luo et al. |
| 2017/0148510 | A1 | 5/2017 | Bazarsky et al. |
| 2018/0024920 | A1* | 1/2018 | Thomas .............. G06F 12/0246 711/103 |
| 2019/0114272 | A1* | 4/2019 | Dubey ................ G06F 13/1694 |
| 2020/0019496 | A1* | 1/2020 | Na ...................... G06F 12/0246 |

OTHER PUBLICATIONS

"International Application Serial No. PCT/CN2017/115425, Written Opinion dated Sep. 10, 2018", 4 pgs.

"NAND Flash Memoriesand Programming NAND Flash Memories Using Elnec Device Programmers", Version 2.11/01.2014, (2014), 44 pgs.

Ma, Dongzhe, et al., "LazyFTL: A Page-level Flash Translation Layer Optimized for NAND Flash Memory", SIGMOD'11, (2011), 12 pgs.

Park, Chanik, et al., "A Reconfigurable FTL (Flash Translation Layer) Architecture for NAND Flash-Based Applications", ACM Transactionson Embedded Computing Systems, vol. 7, No. 4, Article 38, (Jul. 2008), 23 pgs.

Yang, Soo-Hyeon, et al., "An Efficient Mapping Table Management in NAND Flash-Based Mobile Computers", B. Murgante et al. (Eds): ICCSA 2011, Part III, LNCS 6784, (2011), 518-527.

Yang, Soo-Hyeon, et al., "An Efficient Mapping Table Management in NAND Flash-Based Mobile Computers", B. Murgante et al. (Eds): ICCSA 2011, Part III, LNCS, (2011), 2 pgs.

* cited by examiner

SCHEME TO IMPROVE EFFICIENCY OF GARBAGE COLLECTION IN CACHED FLASH TRANSLATION LAYER

PRIORITY APPLICATION

This application is a U.S. National Stage Application under 35 U.S.C. 371 from International Application No. PCT/CN2017/115425, filed Dec. 11, 2017, which is incorporated herein by reference in its entirety.

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a semiconductor memory array of a NAND architecture, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, 3D memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

In general, a NAND device structure offers the capability to write single pages, whereas an erase operation is performed at a block level, which includes a large number of pages. A garbage collection (GC) procedure for a NAND device structure is directed to recover free space when the free physical space in the NAND device becomes low. Garbage collection typically includes recopying logical valid pages from a source block to a destination block. Improvements to NAND device structures may be addressed by advances in the design of management functionalities within such devices including improvements to garbage collection.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
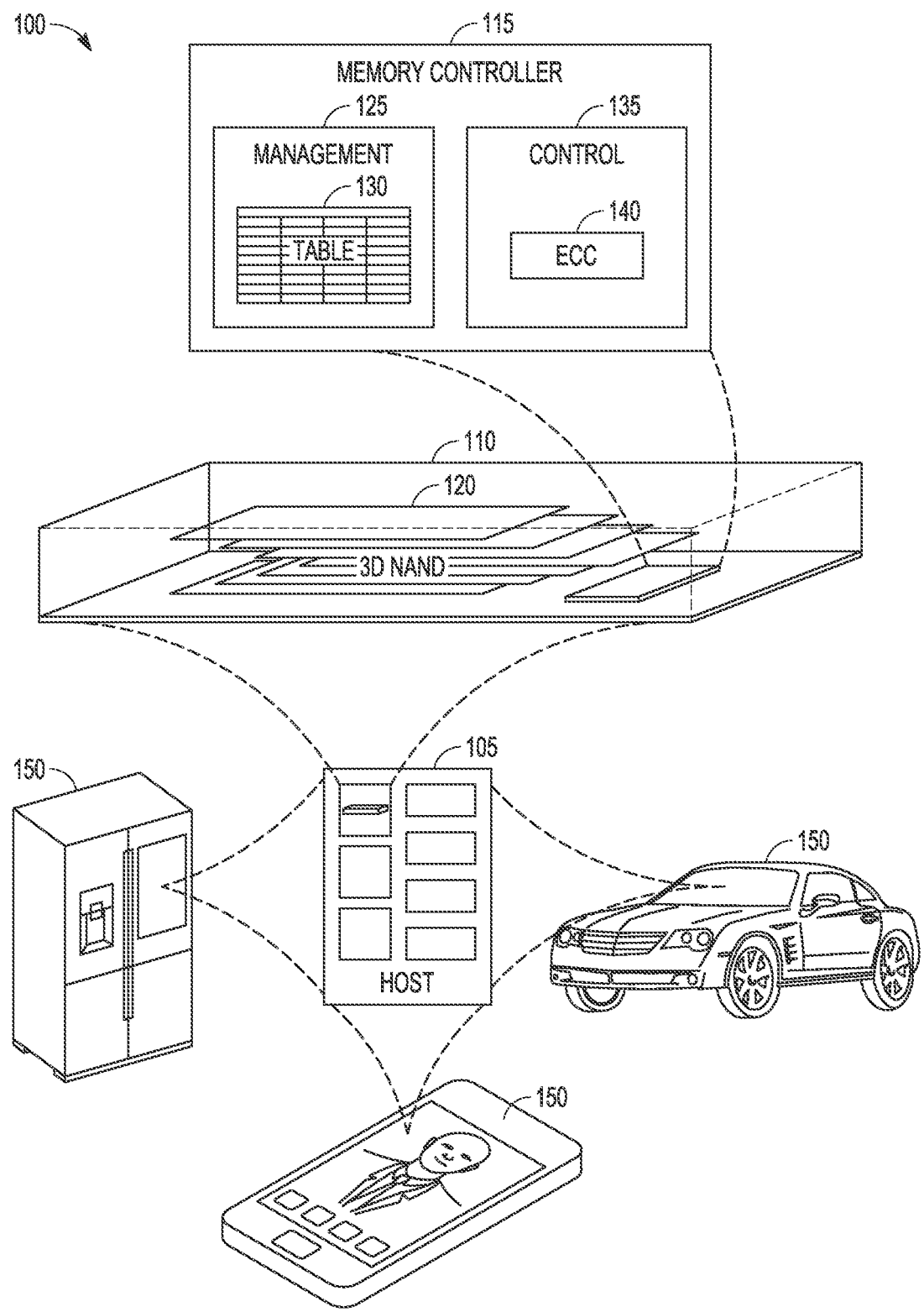
FIG. 1 illustrates an example of an environment including a memory device, according to various embodiments.

For a NAND structure, a mechanism, referred to as a flash translation layer (FTL), is typically implemented that writes updated information to a new empty page and redirects all subsequent read requests to its new address. The FTL operates to evenly distribute newly-programmed pages across all of the available memory locations so that the NAND structure wears evenly. The FTL also maintains a list of all the old invalid pages so that later the old invalid pages can be reused. The FTL for the NAND structure may be implemented in firmware.

One of the main tasks of the FTL in a managed NAND environment is to provide a logical to physical (L2P) remapping of pages in order to overcome the NAND device constraint of write page granularity vs. erase block granularity. Usually, the FTL has an array of addresses, forming a L2P mapping table, whose index represents the logical address, while the contents of each entry represent the physical position on the NAND device.

For a GC procedure, a traditional approach for the FTL to obtain information regarding the valid pages of a source block consists of a search within the L2P mapping table, in which a physical address points to the designated source block that is to be garbage collected. This approach has some drawbacks in a managed NAND environment with limited random access memory (RAM) resources. In the case that a L2P mapping table cannot be all saved in RAM, it is saved in the NAND split into regions, that is, the L2P mapping table can be split into L2P mapping table regions. An FTL that does have not enough RAM to include all L2P regions can be referred to as a cached FTL. However, the search inside the L2P table regions saved in the NAND device may be quite a time consuming process, since it can involve the upload of multiple regions into the RAM before finding the valid pages inside the source garbage block.

In various embodiments, a number of tables can be used to provide an efficient garbage collection procedure for the FTL in a managed NAND environment. A counter table, storing counts of an associated counter, can be associated with a L2P region, which is related to the L2P region itself. The counter table can be inside the associated L2P region or in a location other than inside the associated L2P region. In various embodiments, each L2P region has a counter table. Each count in the counter table can represent the valid page count of each L2P region for each block of the device. This counter table can be referred to, herein, as a region validity counter table (RVCT). For example, a first count of a L2P region labeled x can be the count of how many valid pages are present in NAND block labeled 0 in the region x, and a second count of the L2P region labeled x can be the count of how many valid pages are present in NAND block labeled 1 in the region x.

When the counter for a block inside the RVCT for a region reaches 0, one bit in another table, which can be referred to, herein, as a region validity bitmap table (RVBT), is reset. Similarly, when data is written with a related L2P region touched for the first time inside the block, that is, for the first time the RVCT counter passes from 0 to 1, a bit is raised in the RVBT. RVBT can be divided into chunks, and each chunk can correspond to a block on the device. A chunk is a segment or group of one or more entries of the RVBT. The RVCT can be referred to as a first table and the RVBT can be referred to as a second table in a two table architecture to manage garbage collection for a NAND memory device.

When garbage collection procedure is triggered, the RVBT chunk for each source block can be checked in order to verify which L2P regions are involved for garbage collection. Once individuated, the involved L2P region, which can be indicated with a bit high in the RVBT chunk, can be loaded in RAM and a search on the loaded L2P region can be performed to find the valid pages for the source garbage collection block. In this approach, setting and resetting a bit in the RVBT uses a high bit to represent a block corresponding to a L2P region has at least one valid page. During garbage collection, searches for high bits inside the RVBT can be conducted to determine the L2P regions involved for garbage collection. Alternatively, setting and resetting a bit in the RVBT can use a low bit to represent a block corresponding to a L2P region having at least one valid page. Such inverted logic may be implemented due to hardware architecture and/or hardware constraints. For the inverted approach, during garbage collection, searches for low bits inside the RV BT can be conducted to determine the L2P regions involved for garbage collection.

The approach, as taught herein, can provide OC efficiency over the traditional approach, where the traditional approach includes loading and scanning all the L2P regions in order to find pages inside the source block. However, in various embodiments with the approach taught herein or a similar approach, L2P regions that do not have any valid page inside the source block are not useful regions during GC, and uploading these non-useful regions during GC can be avoided. Not uploading non-useful L2P regions during GC can provide gain in terms of performances and latencies over the traditional approach.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components; a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 500 of FIG. 5.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
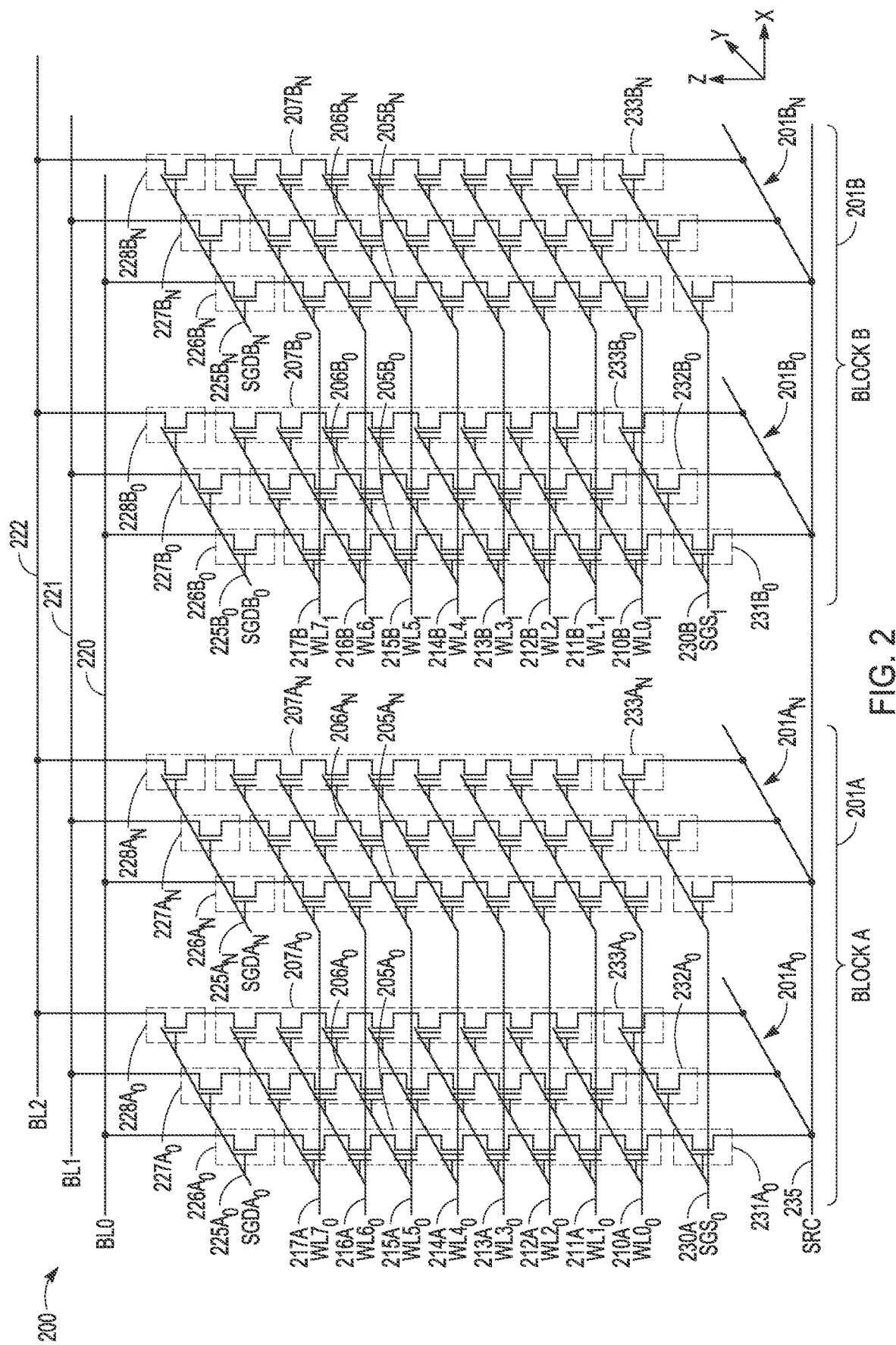
FIG. 2 is a schematic diagram of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third B memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SOS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
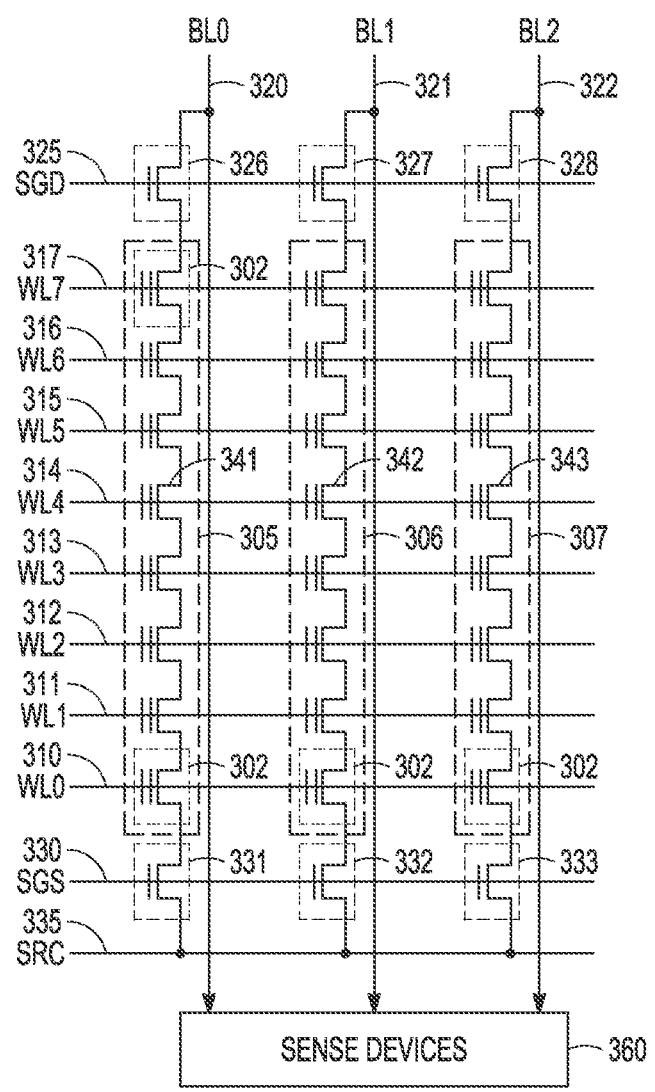
FIG. 3 is a schematic diagram of an example of a three-dimensional NAND architecture semiconductor memory array, according to various embodiments.

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
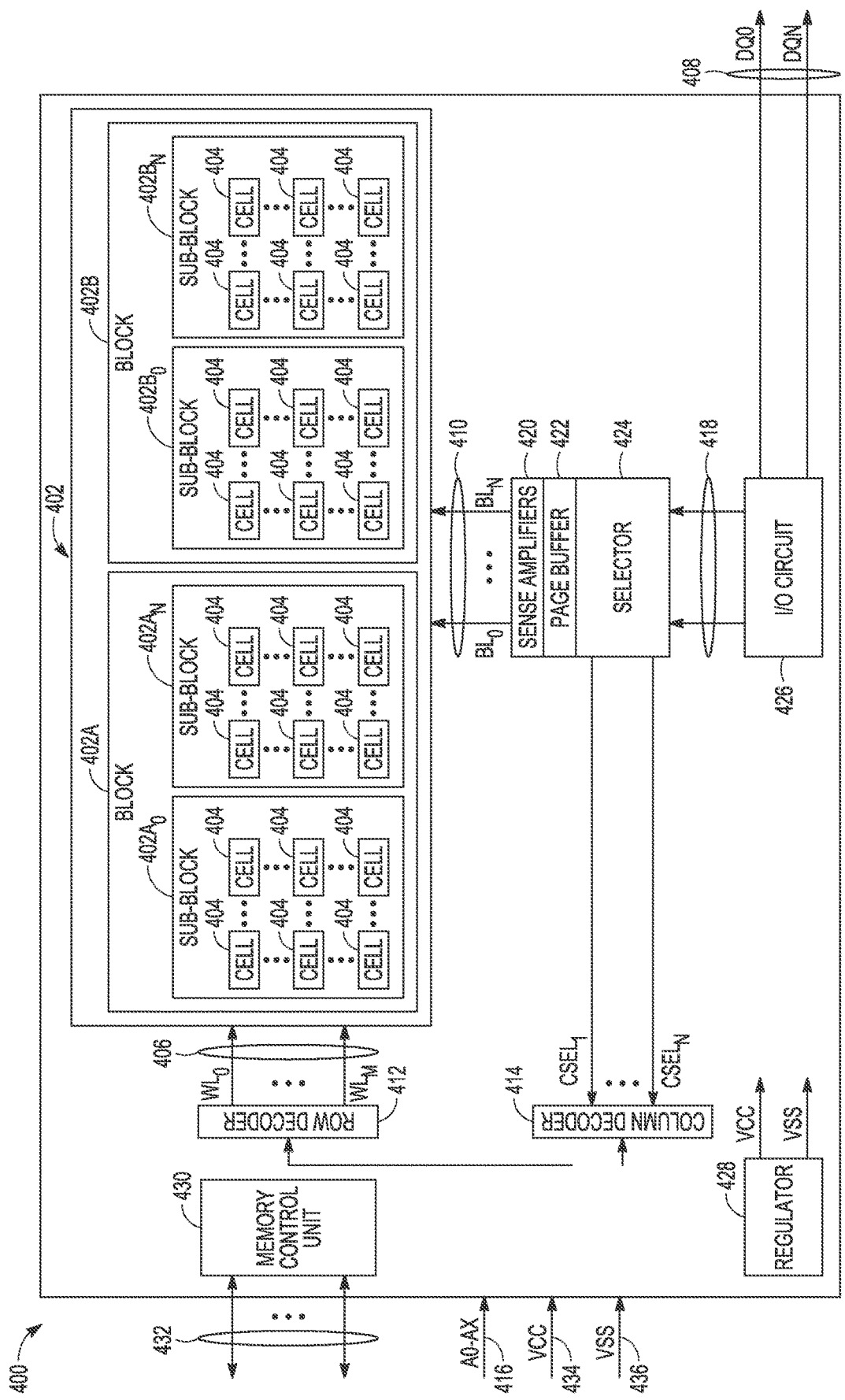
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
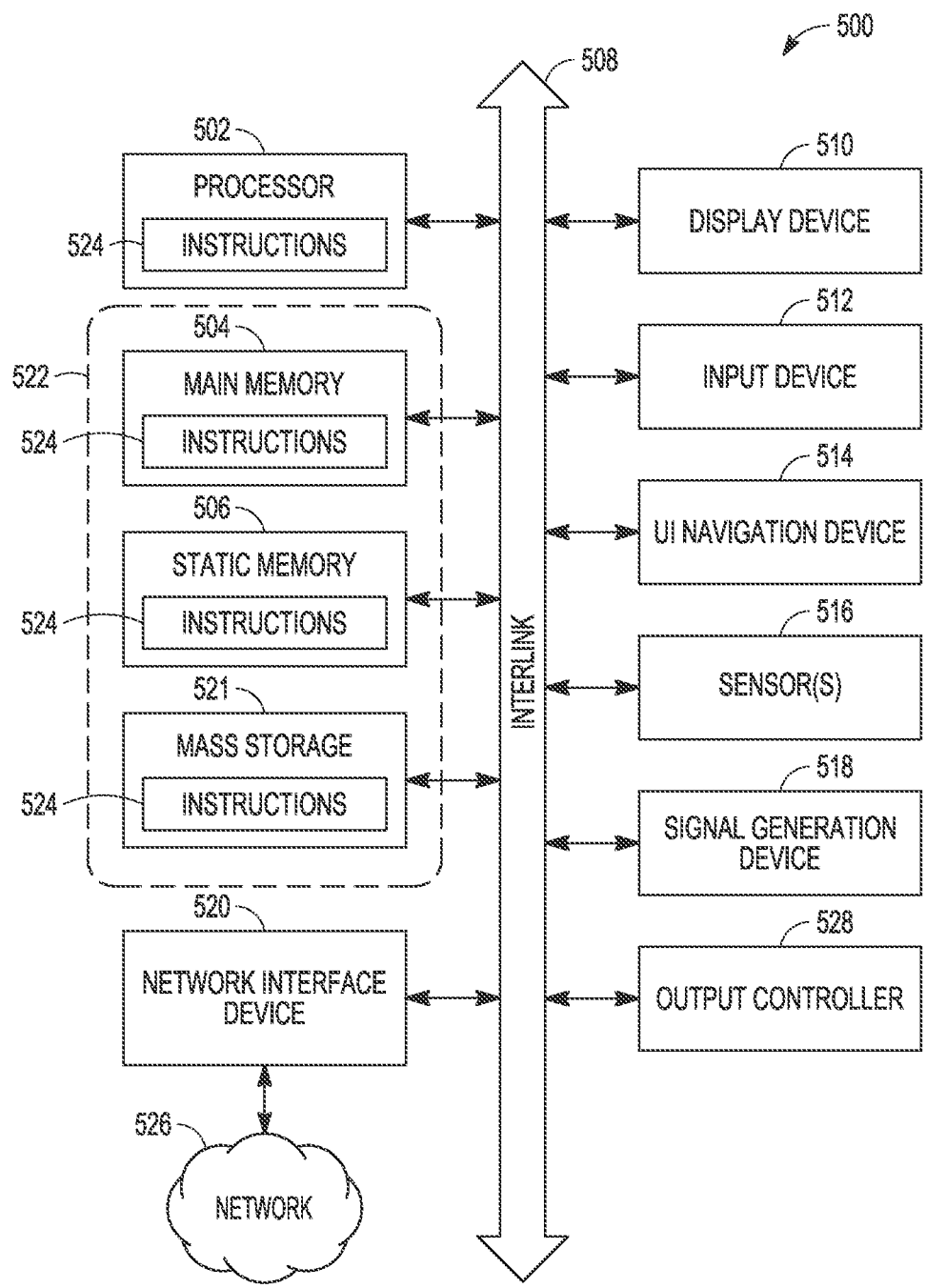
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory controller 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine readable medium 522.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux@ kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi@, IEEE 802.16 family of standards known as WiMax@). IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Typically, when a host processor writes data to a NAND memory device, the data is associated with a logical address for storage of the data in the NAND memory device. Subsequently, the host processor can write the same values of the data to the logical address or write new values of the data to the logical address. Since writing to a NAND memory device is performed on a page basis and erasing is performed on a block basis, when a host processor writes to the same logical address with the same data values or different data values, the data being written is written to a new physical address for the same logical address. The FTL keeps track of the mapping of the same logical address to different physical addresses with an indication or pointer of the current mapping, which is the most recent write to the logical address by the host processor. For the FTL, writing data to the NAND memory device is a writing operation of a logical address to the NAND memory device. The physical locations of data for the logical address mappings, prior to the current mapping, represent pages that are no longer valid for storing data. If a host processor writes five times to a logical address, there can be one valid page and four pages that are not valid. Keeping track of valid pages and freeing memory space associated with invalid pages is a task of the FTL. As discussed earlier, in various embodiments, an architecture and process of operating a two table mechanism, as taught herein, can aid in efficiently managing the allocation of memory space in a NAND memory device.

Figure 6:
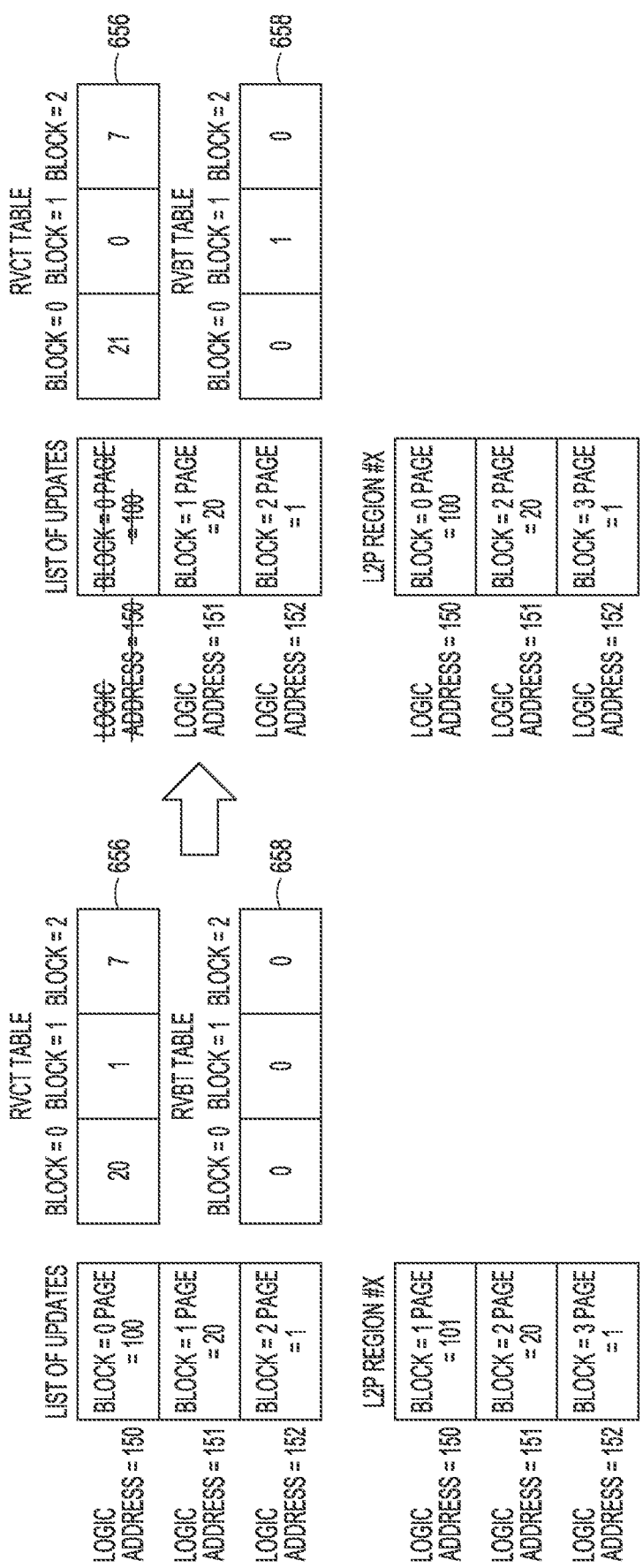
FIG. 6 illustrates an example of updating two tables associated with a flash translation layer for a NAND memory device in response to a write activity to the NAND memory device, according to various embodiments.

FIG. 6 illustrates an example of updating two tables associated with the FTL for a NAND memory device in response to a write activity to the NAND memory device. For ease of discussion, FIG. 6 illustrates a limited number of blocks and one L2P region, labeled L2P region #x, of multiple L2P regions. The first table is a RVCT table 656 associated with L2P region #x, where RVCT table 656 maintains a count of valid pages for each block associated with L2P region #x. The second table is a RVBT table 658 associated with RVCT table 656, where RVBT table 658 maintains an indication of whether a block has valid pages. This indication can be a bit that has two states for a respective block: one state indicates that the block has valid pages and the second state indicates that the block does not have valid pages. RVBT table 658 is a bitmap table, which contains one bit for each counter and for each region. This bit can be set to indicate at least one valid page for that region and for that block.

In a garbage collection procedure, a check of the RVBT table 658 can identify blocks to be involved in the garbage procedure and those blocks not involved. Depending on the hardware and logic implemented with the NAND memory device, the indication of blocks having valid pages can be realized by a low bit, 0, or a high bit, 1. In this example, low bit logic is used such that low bits are searched for inside the RVBT to then search the L2P regions involved for a selected block in a garbage collection procedure. For the set of L2P regions, the RVBT can be realized in a manner similar to a matrix in which there is one bit for each region and each block, which can be one entry in the matrix. Reading the RVBT for the appropriate status bit identifies a corresponding L2P region and its logical to physical mapping table involved in garbage collection.

FIG. 6 illustrates an example of updating two tables associated with a flash translation layer for a NAND memory device in response to a write activity to the NAND memory device. The left side of FIG. 6 shows an instance in operation of an associated NAND memory device in which RVBT 658 indicates that each of block=0, block=1, and block=2 associated with RVCT 656 has at least one valid page. RVBT 658 has one bit for each counter (count) of RVCT 656 and for each L2P region #x. These indications are provided by the low bit, 0, in the entries in RVBT 658. Since each L2P region has its related RVCT, RVCT 656 is the RVCT for L2P region #x. RVCT 656 has a count of the number of valid pages in each of block=0, block=1, and block=2 associated with RVCT 656. In this example, a list of updates are shown for logical addresses 150, 151, and 152 and the L2P region #x for these addresses. RVCT 656 has a count of 20 valid pages for of block=0, 1 valid page for block=1, and 7 valid pages for block=2.

The right side of FIG. 6 shows a later instance in operation of the associated NAND memory device of the left side of FIG. 6, where RVCT 656 and RVBT 658 have been updated. The update is preformed in response to writing to logical address in block 0 for L2P region #x, where previously this logical address was mapped to block 1 for L2P region #x and the pointer to the current mapping changes. Each time the pointer changes, the count for a block is decremented for the block from which a mapping for a logical address is moved and a count is incremented for the block to which the logical address is mapped. There is a transition from 1 to 0 in RVCT 656 for block=1 in L2P region #x, and RVBT 658 is updated to indicate that there are no valid pages for block=1 in L2P region #x by changing 0 to 1 in RVBT 658. If a garbage collection procedure is triggered with the status as shown in FIG. 6B, the L2P mapping table for L2P region #x would not need to be searched for block=1 being a source block for the garbage collection procedure.

Figure 7:
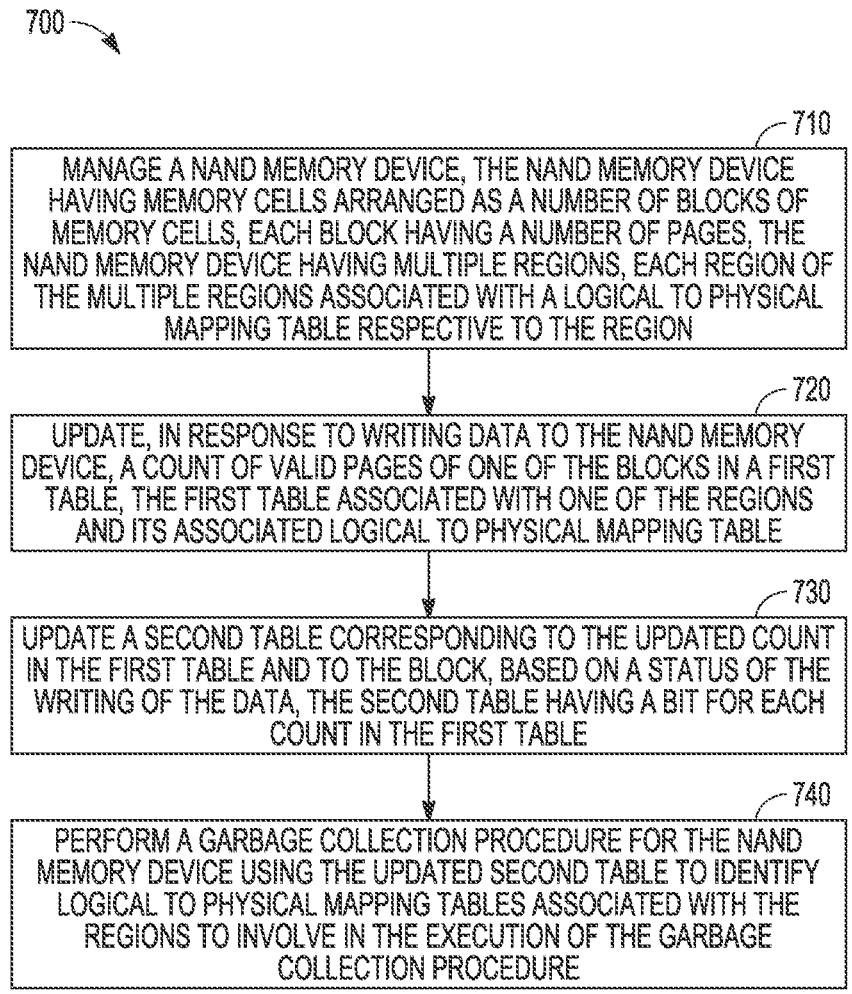
FIG. 7 is a flow diagram of an embodiment of an example method to manage a memory device, according to various embodiments, according to various embodiments.

FIG. 7 is a flow diagram of an embodiment of an example method 700 to manage a memory device. At 710, a NAND memory device is managed, where the NAND memory device has memory cells arranged as a number of blocks of memory cells, each block having a number of pages. The NAND memory device can have multiple regions, where each region of the multiple regions is associated with a logical to physical mapping table respective to the region. At 720, a count of valid pages of one of the blocks is updated in a first table, where the first table is associated with one of the regions and its associated logical to physical mapping table. The first table can have multiple counts with each count in the first table being a valid page count of the region for each block. The updating can be conducted in response to writing data to the NAND memory device. Updating the count can include incrementing the count with writing for a logical address to the block for a first time and decrementing the count when writing for the logical address is to another block.

At 730, a second table corresponding to the updated count in the first table and to the block is updated, where the second table can have a bit for each count in the first table. The updating in the second table can be based on a status of writing of data to the NAND memory device. At 740, a garbage collection procedure for the NAND memory device is performed using the updated second table to identify logical to physical mapping tables associated with the regions to involve in the execution of the garbage collection procedure.

Variations of method 700 or methods similar to method 700 can include a number of different embodiments that may be combined depending on the application of such methods and/or the architecture of systems in which such methods are implemented. Such methods can include, upon triggering the garbage collection procedure, for a chosen source block for the garbage collection procedure, checking the second table correlated to the source block to identify which logical to physical mapping tables are involved in the garbage collection procedure. Such methods can include searching the identified logical to physical mapping tables to find valid pages and writing the found valid pages to a destination block different from the source block.

Figure 8:
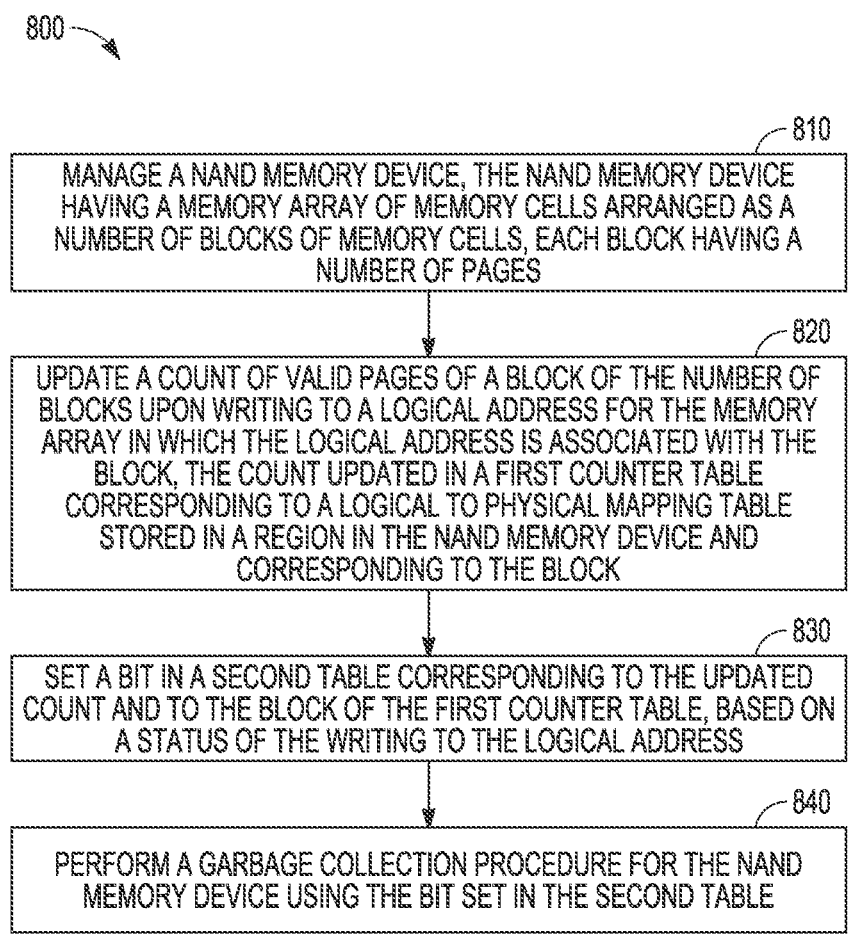
FIG. 8 is a flow diagram of an embodiment of an example method to manage a memory device, according to various embodiments.

FIG. 8 is a flow diagram of an embodiment of an example method to manage a memory device. At 810, a NAND memory device is managed, where the NAND memory device has a memory array of memory cells arranged as a number of blocks of memory cells, each block having a number of pages. At 820, a count of valid pages of a block of the number of blocks is updated upon writing to a logical address for the memory array in which the logical address is associated with the block. The count is updated in a first counter table corresponding to a logical to physical mapping table stored in a region in the NAND memory device and corresponding to the block. The count having a value of zero represents zero number of valid pages in the block for the logical to physical mapping table corresponding to the count. Updating the count can include incrementing the count with writing to the logical address to the block for a first time and decrementing the count when writing to the logical address in another block.

At 830, a bit in a second table corresponding to the updated count and to the block is set. The setting of the bit can be based on a status of the writing of the data. The second table can be divided into chunks, where each chunk corresponds to a respective block of the number of blocks. At 840, a garbage collection procedure for the NAND memory device is performed using the bit set in the second table. Performing the garbage collection process can include choosing a source block for the garbage collection procedure; checking the second table, using the bit set in the second table, associated with the source block to identify which logical to physical mapping table has a mapping of a valid page for the garbage collection procedure; loading the identified logical to physical mapping table into a random access memory; and searching the identified logical to physical mapping table in the random access memory to find the valid page for writing to a source garbage collection block. Such a method can include iteratively: checking the second table to identify other logical to physical mapping tables having indications of a valid page for the garbage collection procedure; loading the identified other logical to physical mapping table into the random access memory; and searching the identified other logical to physical mapping table in the random access memory to find valid pages for writing to a source garbage collection block or another source garbage collection block.

Figure 9:
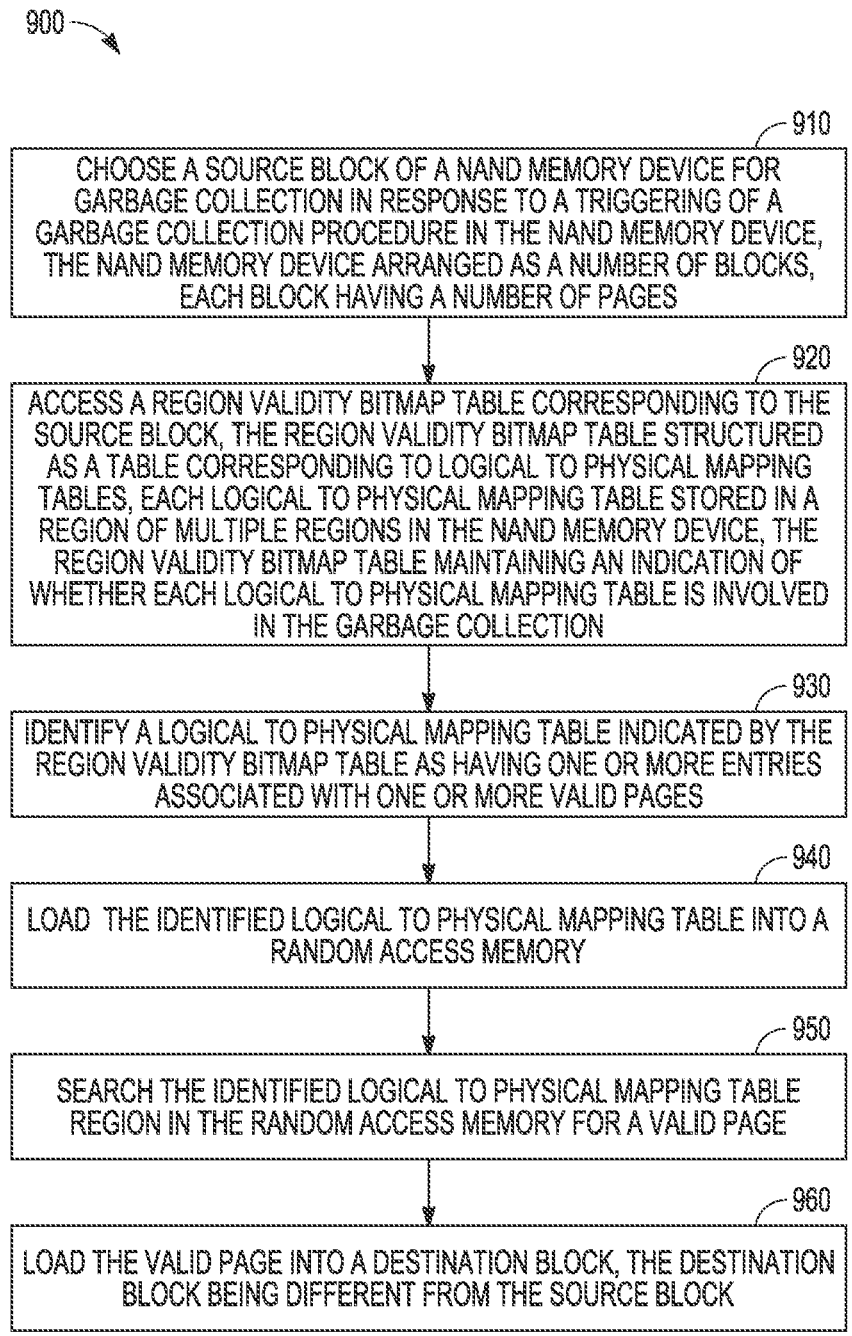
FIG. 9 is a flow diagram of an embodiment of an example method to manage a NAND memory device, according to various embodiments.

FIG. 9 is a flow diagram of an embodiment of an example method 900 to manage a NAND memory device. At 910, a source block of a NAND memory device is chosen for garbage collection in response to a triggering of a garbage collection procedure in the NAND memory device, where the NAND memory device is arranged as a number of blocks, each block having a number of pages. At 920, a region validity bitmap table corresponding to the source block is accessed. The region validity bitmap table can be structured as a table corresponding to logical to physical mapping tables, where each logical to physical mapping table is stored in a region of multiple regions in the NAND memory device. The region validity bitmap table can maintain an indication of whether each logical to physical mapping table is involved in the garbage collection.

At 930, a logical to physical mapping table indicated in the region validity bitmap table as having one or more entries associated with one or more valid pages is identified. At 940, the identified logical to physical mapping table is loaded into a random access memory. At 950, the identified logical to physical mapping table is searched in the random access memory for a valid page. At 960, the valid page is loaded into a destination block, where the destination block is different from the source block.

Variations of method 900 or methods similar to method 900 can include a number of different embodiments that may be combined depending on the application of such methods and/or the architecture of systems in which such methods are implemented. Such methods can include updating the identified logical to physical mapping table after loading the valid page into the destination block. Such methods can include determining other valid pages from searching the identified logical to physical mapping table in the random access memory and loading the other valid pages into the destination block. In addition, such methods can include determining in the region validity bitmap table additional logical to physical mapping tables having entries of valid pages in the source block; loading the additional logical to physical mapping tables into the random access memory; searching the additional logical to physical mapping tables in the random access memory for valid pages; and loading valid pages from searching the additional logical to physical mapping table into the destination block or another destination block.

Firmware for a NAND memory device can comprise instructions, such as a microcode, which when executed by a controller, can cause performance of operations comprising operations, as taught herein, in a variety of applications. Firmware for a NAND memory device can comprise instructions, such as a microcode, which when executed by a controller, can cause performance of operations comprising operations of method 700 and/or methods similar to method 700. Firmware for a NAND memory device can comprise instructions, such as a microcode, which when executed by a controller, can cause performance of operations comprising operations of method 800 and/or methods similar to method 800. Firmware for a NAND memory device can comprise instructions, such as a microcode, which when executed by a controller, can cause performance of operations comprising operations of method 900 and/or methods similar to method 900.

In various embodiments, an apparatus can comprise: a NAND memory device having an array of memory cells arranged as a number of blocks of memory, each block having a number of pages; and firmware including a flash translation layer structured to operate with a logical to physical mapping table, the logical to physical mapping table saved in the NAND memory device and split into logical to physical mapping table regions. Each logical to physical mapping table region can be associated with a first table having a set of counters, the counters of each set can equal in number to the number of blocks of the NAND device associated with the respective logical to physical mapping table region. The flash translation layer can be structured to operate with a second table arranged to contain one or more indications of one or more logical to physical mapping table regions that contain a mapping of one or more valid pages. The firmware can have instructions, when executed by a controller, to enable operations to include conducting a garbage collection procedure in the NAND memory device based on the one or more indications contained in the second table. The array of memory cells can be arranged as a planar structure or arranged as a three-dimensional structure of strings of memory cells with memory cells vertically stacked in each string.

The second table can contain a bit for each counter of the first table, and the operations can include: an increment or a decrement of a counter of the set of counters associated with a block of the number of blocks upon writing data to the memory array in which the data is associated with the block; and a setting of a bit in the second table corresponding to the incremented or decremented counter and the block, based on a status of the writing of the data. The counter can be incremented with the writing to a logical address to the block for a first time and the counter can be decremented when writing to the logical address to another block. The second table can be divided in chunks and each chunk corresponds to a block on the NAND memory device.

Executed instructions can include performing operations to include management of a garbage collection procedure such that, upon triggering the garbage collection procedure, each chunk for each block chosen as a source block for the garbage collection procedure is checked to identify which logical to physical mapping table regions are involved in the garbage collection procedure. The apparatus can include a random access memory configured to individually receive the identified logical to physical mapping table regions for search of valid pages to copy to a destination block in the garbage collection procedure. Variations of the above apparatus or similar apparatus can include a number of different embodiments that may be combined depending on the application of such apparatus and/or the architecture of systems in which such apparatus are implemented.

Figure 10:
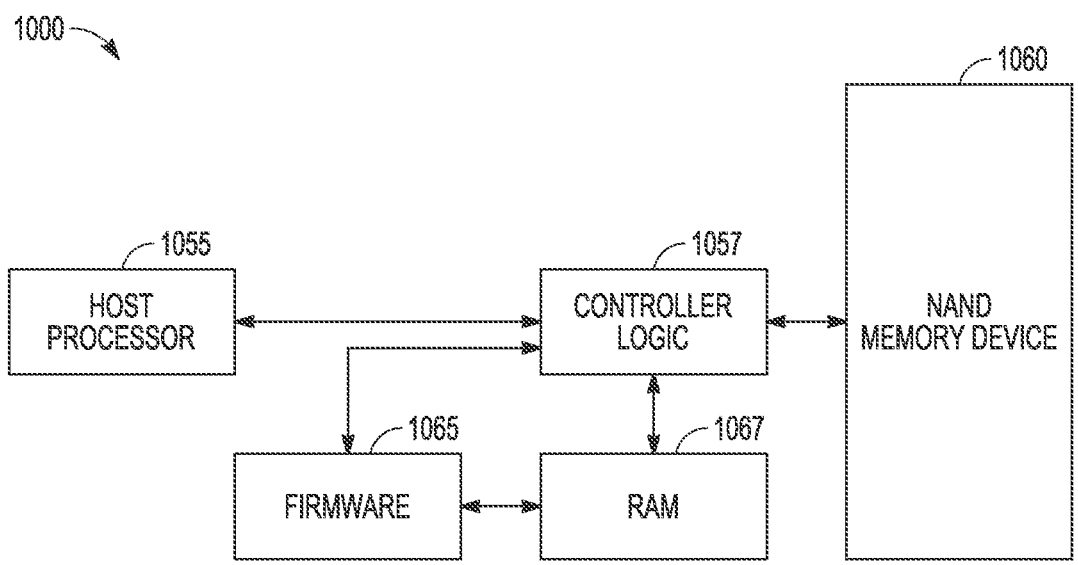
FIG. 10 is a block diagram of an example system having a host processor communicatively coupled with a NAND memory device, according to various embodiments.

FIG. 10 is a block diagram of a system 1000 having a host processor 1055 communicatively coupled with a NAND memory device 1050. NAND memory device 1050 can be structured with an array of memory cells arranged as a number of blocks of memory, where each block has a number of pages. The array of memory cells may be arranged as a planar array or the array of memory cells is arranged as a three-dimensional structure of strings of memory cells with memory cells vertically stacked in each string. Host processor 1055 can provide control commands to read from, write to, and erase memory locations in NAND memory device 1050. The control commands for controlling data to and from NAND memory device may be facilitated by controller logic 1057.

System 1000 can include firmware 1065 associated with NAND memory device 1050 that can be used in conjunction with controller logic 1057 to manage NAND memory device 1050. The firmware can include a FTL structured to operate a logical to physical mapping table. The logical to physical mapping table for FLT of firmware 1065 can be saved in the NAND memory device 1050 and can be split into logical to physical mapping table regions. Each logical to physical mapping table region can be associated with a first table arranged as a counter table with a set of counters or counts. The number of counters of each set can be equal to the number of blocks of the NAND device associated with the respective logical to physical mapping table region. Firmware 1065 can be structured to operate with a second table associated with the FTL that contains a bit for each counter of each logical to physical mapping table region. The second table can be divided in chunks with each chunk corresponding to a block on the NAND memory device.

Firmware 1065 can include instructions that, when executed by a controller, enable operations to manage NAND memory device 1050. The operations can include an increment or a decrement of a counter of the set of counters associated with a block of the number of blocks of NAND memory device 1050 upon writing to a logical address for the memory array of NAND memory device 1050. A bit in the second table can be set corresponding to the incremented or decremented counter and the block, based on a status of the writing of the data. The operations can include management of a garbage collection procedure such that, upon triggering the garbage collection procedure, each chunk of the second table for each block chosen as a source block for the garbage collection procedure is checked to identify which logical to physical mapping table regions, and hence regions, are involved in the garbage collection procedure. System 1000 can include a RAM 1067 configured to individually receive the identified logical to physical mapping table regions for search of valid pages to copy to a destination block in the garbage collection procedure.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon studying the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations.

What is claimed is:

1. A method comprising:
managing a NAND memory device, the NAND memory device having memory cells arranged as a number of blocks of memory cells, each block having a number of pages, the NAND memory device having multiple regions, each region of the multiple regions associated with a logical to physical mapping table respective to the region, each region having multiple blocks assigned to the region;
updating, in response to writing data to the NAND memory device, a count of valid pages of one block of the blocks in a first table, the first table associated with one region of the regions and its associated logical to physical mapping table, the first table having multiple counts with each count in the first table being a valid page count for each block of the one region;
resetting a bit in a second table in response to the updating of the count for the one block being a decrement to zero in the first table, identifying zero valid pages in the one block in the one region, the bit in the second table corresponding to the count in the first table for the one block of the one region, the second table having a bit for each count in the first table; and
performing a garbage collection procedure for the NAND memory device using the updated second table to identify logical to physical mapping tables associated with the regions to involve in execution of the garbage collection procedure.

2. The method of claim 1, wherein updating the count in the first table includes incrementing the count with writing for a logical address to the block for a first time and decrementing the count when writing for the logical address is to another block.

3. The method of claim 1, wherein the method includes, upon triggering the garbage collection procedure, for a chosen source block for the garbage collection procedure, checking the second table correlated to the source block to identify which logical to physical mapping tables are involved in the garbage collection procedure.

4. The method of claim 3, wherein the method includes searching the identified logical to physical mapping tables to find valid pages and writing the valid pages, found from the searching, to a destination block different from the source block.

5. A method comprising:
managing a NAND memory device, the NAND memory device having a memory array of memory cells arranged as a number of blocks of memory cells, each block having a number of pages;
updating a count of valid pages of a block of the number of blocks upon writing to a logical address for the memory array in which the logical address is associated with the block, the count updated in a first counter table corresponding to a logical to physical mapping table stored in a region in the NAND memory device and corresponding to the block;
resetting a bit in a second table in response to the updating of the count for the block in the first counter table being a decrement to zero, identifying zero valid pages in the block, the bit in the second table corresponding to the count in the first counter table, the second table having a bit for each count in the first table; and
performing a garbage collection procedure for the NAND memory device using the bit reset and other bits in the second table.

6. The method of claim 5, wherein the first counter table and the second table are associated with a flash translation layer for the NAND memory device.

7. The method of claim 5, wherein updating the count includes incrementing the count with writing to the logical address to the block for a first time and decrementing the count when writing to the logical address in another block.

8. The method of claim 5, wherein performing the garbage collection procedure includes:
choosing a source block for the garbage collection procedure;
checking the second table for non-reset bits in the second table, associated with the source block to identify an logical to physical mapping table having a mapping of a valid page for the garbage collection procedure;
loading the identified logical to physical mapping table into a random access memory; and
searching the identified logical to physical mapping table in the random access memory to find the valid page for writing to a source garbage collection block.

9. The method of claim 8, wherein the method includes iteratively:
checking the second table to identify another logical to physical mapping table having indications of a valid page for the garbage collection procedure;
loading the identified other logical to physical mapping table into the random access memory; and
searching the identified other logical to physical mapping table in the random access memory to find valid pages for writing to the source garbage collection block or another source garbage collection block.

10. The method of claim 5, wherein the second table is divided into chunks and each chunk corresponds to a respective block of the number of blocks.

11. A method comprising:
choosing a source block of a NAND memory device for garbage collection in response to a triggering of a garbage collection procedure in the NAND memory device, the NAND memory device arranged as a number of blocks, each block having a number of pages;
accessing a region validity bitmap table corresponding to the source block, the region validity bitmap table structured as a table corresponding to logical to physical mapping tables, each logical to physical mapping table stored in a region of multiple regions in the NAND memory device, the region validity bitmap table, in conjunction with a region validity counter table having counts of valid pages for each block of the region, maintaining an indication of whether each logical to physical mapping table is involved in the garbage collection such that a bit in the region validity bitmap table for a block in the region is reset in response to decrementing a count to zero in the region validity counter table for the block in the region, identifying zero valid pages in the block in the region, the region validity bitmap table having a bit for each count in the region validity counter table;
identifying a logical to physical mapping table indicated by the region validity bitmap table as having one or more entries associated with one or more valid pages;
loading the identified logical to physical mapping table into a random access memory;
searching the identified logical to physical mapping table in the random access memory for a valid page; and
loading the valid page into a destination block, the destination block being different from the source block.

12. The method of claim 11, wherein the method includes updating the identified logical to physical mapping table after loading the valid page into the destination block.

13. The method of claim 11, wherein the method includes determining other valid pages from searching the identified logical to physical mapping table in the random access memory and loading the other valid pages into the destination block.

14. The method of claim 11, wherein the method includes:
determining in the region validity bitmap table additional logical to physical mapping tables having entries of valid pages in the source block;
loading the additional logical to physical mapping tables into the random access memory;
searching the additional logical to physical mapping tables in the random access memory for valid pages; and
loading valid pages from searching the additional logical to physical mapping tables into the destination block or another destination block.

15. An apparatus comprising:
a NAND memory device having an array of memory cells arranged as a number of blocks of memory, each block having a number of pages; and
firmware including a flash translation layer structured to operate with a logical to physical mapping table, the logical to physical mapping table saved in the NAND memory device and split into logical to physical table regions, each logical to physical mapping table region associated with a first table having a set of counters, the counters of each set equal in number to the number of blocks of the NAND device associated with the respective logical to physical mapping table region, and the flash translation layer structured to operate with a second table arranged to contain one or more indications of one or more logical to physical mapping table regions containing a mapping of one or more valid pages, updating of the second table being responsive to the first table such that a bit in the second table is reset in response to a count of valid pages for a block being decremented to zero in the first table, identifying zero valid pages in the block, the firmware including instructions, when executed by a controller, to enable operations including conducting a garbage collection procedure in the NAND memory device based on the one or more indications contained in the second table.

16. The apparatus of claim 15, wherein the second table contains a bit for each counter of the first table, the firmware including instructions, when executed by a controller, that enable operations, the operations including:
an increment or a decrement of a counter of the set of counters associated with a block of the number of blocks upon writing data to the array in which the data is associated with the block; and
a setting of a bit in the second table corresponding to the incremented or decremented counter and the block, based on a status of the writing of the data.

17. The apparatus of claim 16, wherein the counter is incremented with writing to a logical address to the block for a first time and is decremented when writing to the logical address to another block.

18. The apparatus of claim 16, wherein the second table is divided in chunks and each chunk corresponds to a block on the NAND memory device.

19. The apparatus of claim 18, wherein the operations include management of a garbage collection procedure such that, upon triggering the garbage collection procedure, each chunk for each block chosen as a source block for the garbage collection procedure is checked to identify which logical to physical mapping table regions are involved in the garbage collection procedure.

20. The apparatus of claim 19, wherein the apparatus includes a random access memory configured to individually receive the identified logical to physical mapping table regions for search of valid pages to copy to a destination block in the garbage collection procedure.

21. The apparatus of claim 15, wherein the array of memory cells is arranged as a three-dimensional structure of strings of memory cells with memory cells vertically stacked in each string.

22. A system comprising:
a host processor;
a NAND memory device communicatively coupled with the host processor, the NAND memory device having an array of memory cells arranged as a number of blocks of memory, each block having a number of pages; and
firmware including a flash translation layer structured to operate with a logical to physical mapping table, the logical to physical mapping table saved in the NAND memory device and split into logical to physical mapping table regions, each logical to physical mapping table region associated with a set of counters, the number of counters of each set equal to the number of blocks of the NAND device associated with the respective logical to physical mapping table region, and the flash translation layer structured to operate with a second table that contains a bit for each counter of each logical to physical mapping table region, the firmware including instructions, when executed by a controller, that enable operations, the operations including:
an increment or a decrement of a counter of the set of counters associated with a block of the number of blocks upon writing data to the array in which the data is associated with the block; and
a setting of a bit in the second table in response to and corresponding to the incremented or decremented counter and the block, based on a status of the writing of the data, including resetting the bit in the second table in response to the counter for the block being decremented to zero, identifying zero valid pages in the block, the bit in the second table corresponding to the counter for the block of the one region, the second table having a bit for each counter.

23. The system of claim 22, wherein the second table is divided in chunks with each chunk corresponding to a block on the NAND memory device.

24. The system of claim 23, wherein the operations include management of a garbage collection procedure such that, upon triggering the garbage collection procedure, each chunk for each block chosen as a source block for the garbage collection procedure is checked to identify which logical to physical mapping table regions are involved in the garbage collection procedure.

25. The system of claim 24, wherein the system includes a random access memory configured to individually receive the identified logical to physical mapping table regions for search of valid pages to copy to a destination block in the garbage collection procedure.

* * * * *